United States Patent
Weatherl et al.

(10) Patent No.: US 10,724,563 B1
(45) Date of Patent: Jul. 28, 2020

(54) TRUSS ROD COUPLING DEVICE

(71) Applicant: REINKE MANUFACTURING CO., INC., Deshler, NE (US)

(72) Inventors: Bradley George Weatherl, Fairbury, NE (US); Mark Randall Virus, Hebron, NE (US); Russell Scott Reinke, Davenport, NE (US); Darin Joseph Neff, Hebron, NE (US)

(73) Assignee: REINKE MANUFACTURING CO., INC., Deshler, NE (US)

( * ) Notice: Subject to any disclaimer, the term of this patent is extended or adjusted under 35 U.S.C. 154(b) by 0 days.

(21) Appl. No.: 16/377,672

(22) Filed: Apr. 8, 2019

(51) Int. Cl.
*F16B 7/18* (2006.01)
*E04C 3/02* (2006.01)

(52) U.S. Cl.
CPC ................ *F16B 7/185* (2013.01); *E04C 3/02* (2013.01)

(58) Field of Classification Search
CPC ..... F16B 7/185; E04C 3/02; E04C 2003/0486
See application file for complete search history.

(56) References Cited

U.S. PATENT DOCUMENTS

| | | | | |
|---|---|---|---|---|
| 2,146,540 A | * | 2/1939 | Burke | E04C 3/09 52/693 |
| 4,030,264 A | * | 6/1977 | Jackson | E04C 3/292 52/693 |
| 5,974,759 A | * | 11/1999 | Burger | E04C 5/065 411/508 |
| 6,758,022 B1 | * | 7/2004 | Coll | E04C 3/09 52/638 |
| 6,799,406 B2 | * | 10/2004 | Gosselin | B21D 47/04 52/694 |
| 6,892,502 B1 | * | 5/2005 | Hubbell | E04C 3/08 40/584 |
| 8,881,486 B2 | * | 11/2014 | Robinson | E04C 3/02 52/692 |
| 8,910,447 B2 | * | 12/2014 | Wallther | E04B 1/40 52/655.1 |
| 8,959,868 B2 | * | 2/2015 | Robinson | E04C 3/08 403/408.1 |

* cited by examiner

*Primary Examiner* — Patrick J Maestri
(74) *Attorney, Agent, or Firm* — Shook, Hardy & Bacon L.L.P.

(57) ABSTRACT

Aspects of the disclosure provide a non-welded, clevis-type coupling assembly that provides two sheer planes and, accordingly, increases the load bearing capacity thereof. The assembly includes a coupling plate having a first section, a second section, and a third section. The second section is intermediate the first section and the third section and the first and third sections are oriented at an angle of 90° with respect to one another. The coupling plate includes a contiguous opening extending there through having a first part and a second part. The first part has a first dimension and the second part has a second dimension that is larger than the first dimension.

20 Claims, 6 Drawing Sheets

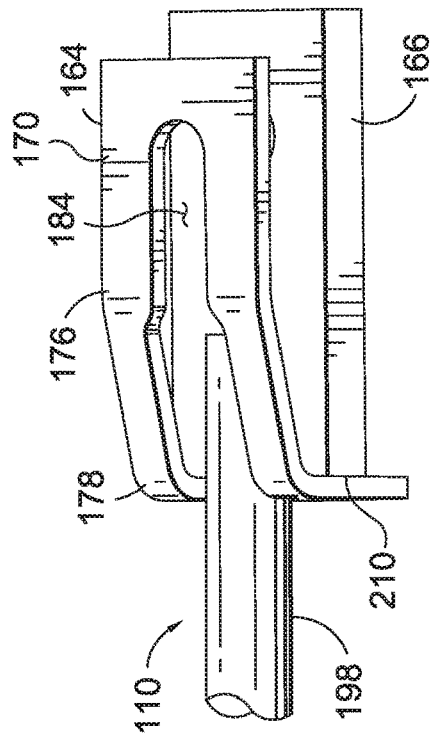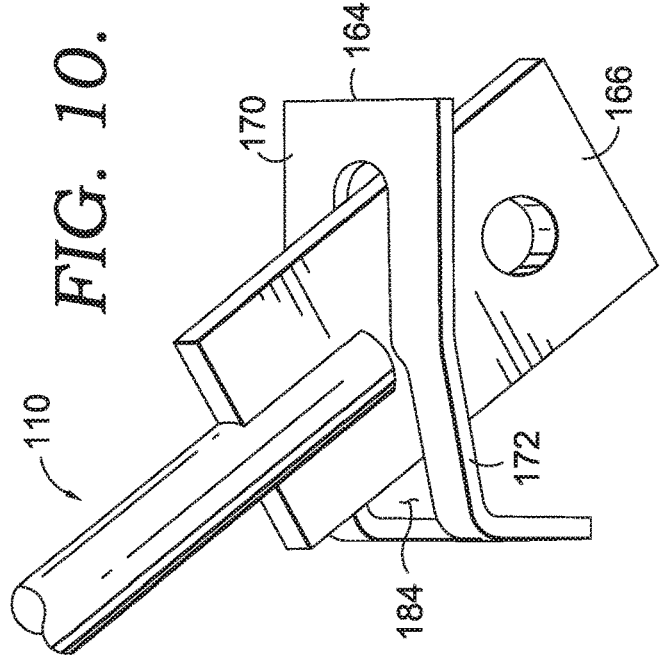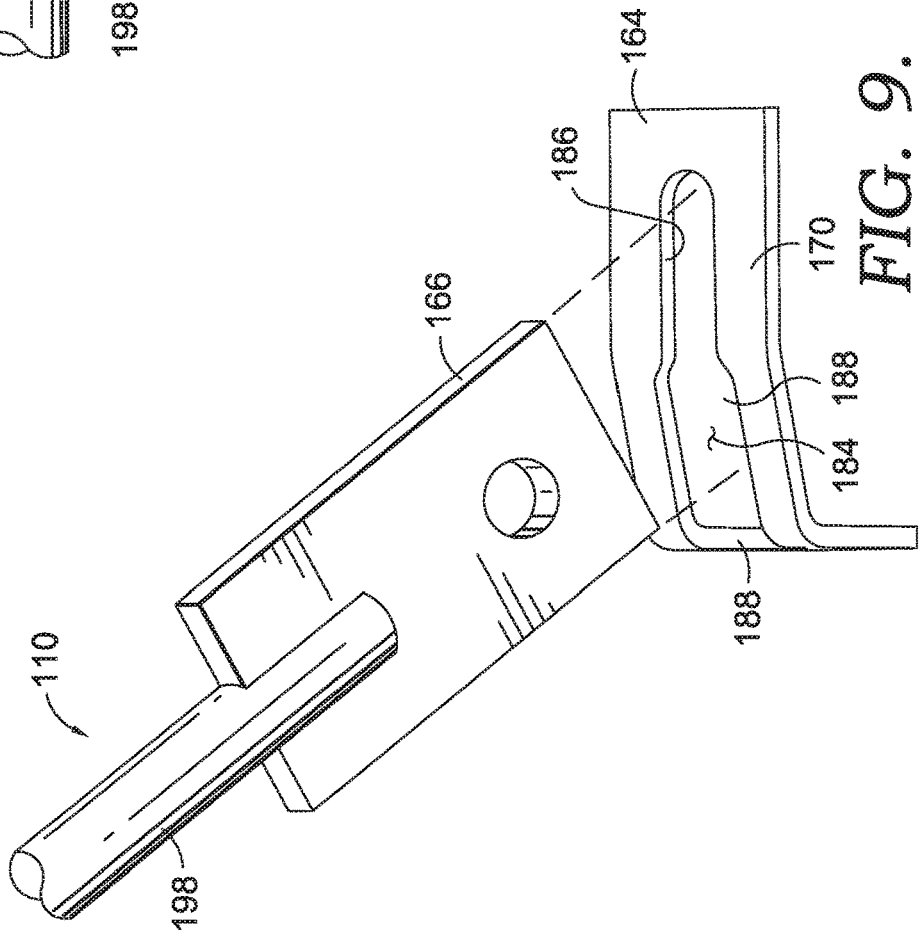

TRUSS ROD COUPLING DEVICE

TECHNICAL FIELD

The present disclosure generally relates to equipment having at least one plated rod or support and more particularly to a plated rod coupling device that creates multiple sheer planes for increasing the load bearing capacity at plated rod coupling joints. The present disclosure further relates to a method for forming a coupled plated rod assembly utilizing the plated rod coupling device.

BACKGROUND

The following discussion of the background of the disclosure is intended to facilitate an understanding of the present disclosure. However, it should be appreciated that the discussion is not an acknowledgement or admission that any of the referenced material was published, known, or part of the common general knowledge as of the priority date of the application. Some embodiments of the disclosure are described herein with reference to irrigation equipment, machines and/or systems. However, it will be understood and appreciated by those having ordinary skill in the art that embodiments of the disclosure are not limited to irrigation system applications and may be used in other applications where increasing the load bearing capacity at plated rod coupling joints (e.g., grain elevator legs, truss support systems, and the like) would be beneficial.

Mechanized irrigation systems provide the ability to manage water resources and, in some instances, other fluids. For example, mechanized irrigation systems can enable application of an optimal amount of water at critical times during a crop's life cycle, fortifying crop health and maximizing yield potential. While there are many components that make up mechanized irrigation systems, in a general sense, such systems include a mechanical structure, a drivetrain, and a control system. One common type of mechanized irrigation system is a center pivot arrangement that includes a central pivot point about which the system rotates, swivels, or revolves. The central pivot point generally includes a rotational swivel and bearing assembly that supports an irrigation pipeline having one or more spans. A "span," as the term is used herein, is a structural assembly comprised of a substantially horizontal irrigation pipeline supported by a truss structure having struts and/or braces and a truss rod connection system. Truss rods are a key structural component contributing to the load bearing capacity of such irrigation systems.

Truss rods are available in different styles. One common type of truss rod comprises an elongated shaft formed from a structural rod material with a formed head having a circular or tri-lobular disc-like bulge larger than the diameter of the shaft at one or both ends thereof. Another type of truss rod comprises an elongated shaft formed from a structural rod material and having a rectangular plate attached to one or both ends thereof. With reference to FIG. 1, when connected in a truss rod connection system in accordance with existing systems, plated truss rods 110, 112 (or plate-style truss rods) provide a single sheer plane 114 at the coupling site. This type of coupling is adequate for many span lengths and types and has proven beneficial in many applications for decades. However, there are applications in which additional load bearing capacity may be beneficial, for instance, for extremely large and/or long spans.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Aspects of the disclosure provide a non-welded, clevis-type coupling assembly that provides two sheer planes and, accordingly, increases the load bearing capacity thereof. The assembly includes a coupling plate having a first section, a second section, and a third section, each section existing on a different plane. The second section is intermediate and positioned between the first section and the third section and the first and third sections are oriented at an angle of 90° with respect to one another. The coupling plate includes a contiguous opening extending there through having a first part and a second part. The first part has a first dimension and the second part has a second dimension that is larger than the first dimension.

The non-welded, clevis-type assembly further includes a first truss rod having a plated end and a second truss rod having a plated end. The plated end of the first truss rod is positioned such that a top surface thereof is parallel to a bottom surface of the first section of the coupling plate and a non-plated portion of the first truss rod extends through the contiguous opening. The plated end of the second truss rod is positioned at least partially between the first section of the coupling plate and the plated end of the first truss rod. A top surface of the plated end of the second truss rod abuts the bottom surface of the first section of the coupling plate forming a first sheer plane. A bottom surface of the plated end of the second truss rod abuts the top surface of the plated end of the first truss rod forming a second sheer plane. In aspects, the truss rod coupling assembly includes at least one mechanical brace structure positioned beneath a bottom surface of the plated end of the first truss rod.

The non-welded, clevis-type assembly further includes a fastening bolt extending through the first part of the contiguous opening in the coupling plate, the plated end of the first truss rod, the plated end of the second truss rod, and the mechanical brace structure. A nut is mated with the fastening bolt to couple the items together and secure the truss rod assembly.

BRIEF DESCRIPTION OF THE DRAWINGS

Aspects of the disclosure are described in detail below with reference to the attached drawing figures, wherein:

FIG. 9 is perspective view illustrating an orientation of a first truss rod with respect to the coupling plate in order to couple the coupling plate with the first truss rod, in accordance with embodiments of the present disclosure;

FIG. 10 is a perspective view illustrating an orientation of a plated end of the first truss rod being received in the contiguous opening of the coupling plate midway through coupling the coupling plate with the first truss rod, in accordance with embodiments of the present disclosure;

FIG. 11 is a perspective view illustrating an orientation where the coupling plate is fully received on and coupled with the first truss rod, in accordance with embodiments of the present disclosure.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter also might be embodied in other ways, to include different components, steps, or combinations of components and/or steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the disclosure provide a non-welded, clevis-type truss rod assembly that provides two sheer planes. The assembly includes a coupling plate having a first section, a second section, and a third section, each section existing on a different plane. The second section is positioned intermediate and between the first section and the third section and the first and third sections are oriented at an angle of 90° with respect to one another. The coupling plate includes a contiguous opening extending there through having a first part and a second part. The first part has a first dimension and the second part has a second dimension that is larger than the first dimension.

The assembly further includes a first truss rod having a plated end and a second truss rod having a plated end. The plated end of the first truss rod is positioned such that a top surface thereof is parallel to a bottom surface of the first section of the coupling plate and a non-plated portion of the first truss rod extends through the contiguous opening. The plated end of the second truss rod is positioned at least partially between the first section of the coupling plate and the plated end of the first truss rod. A top surface of the plated end of the second truss rod abuts the bottom surface of the first section of the coupling plate, forming a first sheer plane. A bottom surface of the plated end of the second truss rod abuts the top surface of the plated end of the first truss rod, forming a second sheer plane. In aspects, the truss rod coupling assembly includes at least one mechanical brace structure positioned beneath a bottom surface of the plated end of the first truss rod.

The assembly further includes a fastening bolt extending through the first part of the contiguous opening in the coupling plate, the plated end of the first truss rod, the plated end of the second truss rod, and the mechanical brace structure. A nut is mated with the fastening bolt to couple the items together and secure the truss rod assembly.

Figure 2:
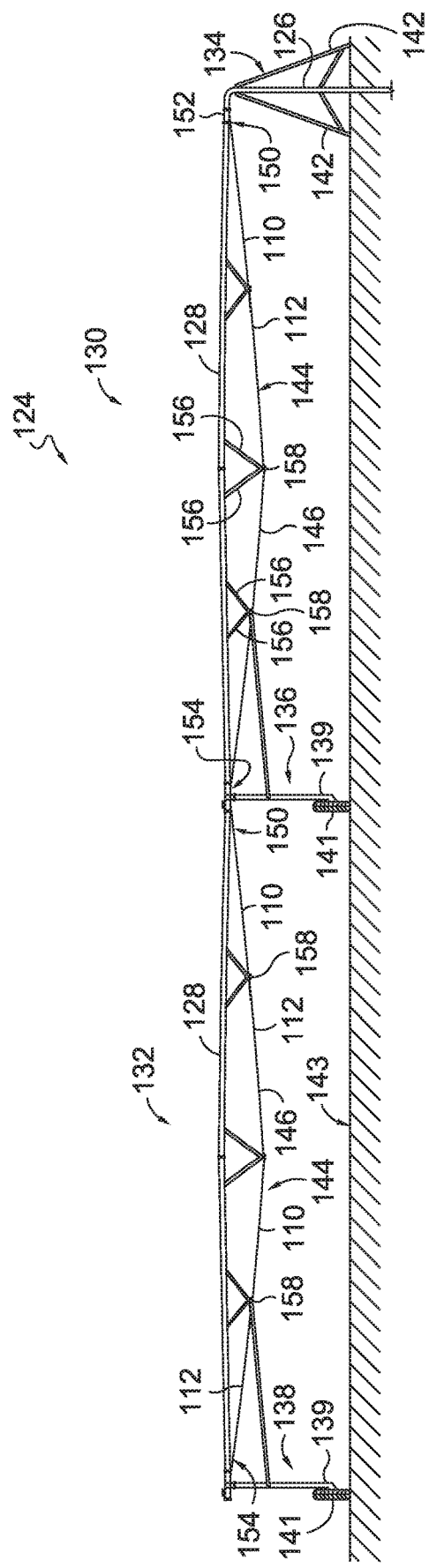
FIG. 2 is a front elevation view of an exemplary mechanized irrigation system suitable for use with embodiments of the present disclosure.

Turning now to FIG. 2, a front elevation view of an exemplary mechanized irrigation system 124 suitable for use with embodiments of the present disclosure is shown. The illustrated mechanized irrigation system 124 extends from a generally vertical fluid source 126 configured for, e.g., accessing water from a water resource, such as a well. In one aspect, the fluid source 126 is of a suitable structural material such as galvanized steel, aluminum or the like. One or more pumps (not shown) associated with the mechanized irrigation system 124 supply water to an irrigation pipeline 128, which runs the length of the irrigation system 124. The illustrated mechanized irrigation system 124 is a center-pivot type irrigation system that revolves or rotates around the fluid source 126. In other aspects, however, the irrigation system 124 may be a linear or lateral move irrigation system, or any other type of irrigation system.

As illustrated, the mechanized irrigation system 124 comprises a first span 130 and a second span 132. It will be understood and appreciated by those having ordinary skill in the art that a two-span irrigation system is exemplary only and the illustrated system 124 is not meant to limit embodiments of the present disclosure in any way. Mechanized irrigation systems having one or any other number of spans are contemplated to be within the scope of embodiments hereof. Each span 130, 132 includes a portion of the irrigation pipeline 128. The first span 130 extends between a pivot tower 134 supporting the fluid source 126 and a first motorized tower 136. The second span 132 extends between the first motorized tower 136 and a second motorized tower 138. Each of the first and second motorized towers 136, 138 includes one or more support legs 139 and one or more wheels 141. In some aspects, the first and second motorized towers 136, 138 are self-propelled and include a drive unit that causes the wheels to rotate to carry the irrigation pipeline 128 over a field 143. In one aspect, the irrigation pipeline 128 is formed from a suitable structural material such as galvanized steel, aluminum, or the like. The first span 130 and the second span 132 are substantially similar and the following description of the first span 130 applies equally to the second span 132, unless otherwise noted. Though not shown in FIG. 2, the mechanized irrigation system 124 may additionally include an ancillary span coupled with the end of the irrigation pipeline 128 that is positioned furthest from the fluid source 126 at a coupling point. Such an ancillary span is movable about the coupling point independent of movement of the irrigation pipeline 128 and is configured to increase the reach of fluid (e.g., water) distribution from the irrigation system 124 beyond the radial reach of the irrigation pipeline 128.

Sprinklers (not shown), or other fluid emitting devices, may be positioned along the irrigation pipeline 128 (and the ancillary span, if present). Sprinklers used with the exemplary irrigation system 124 may include, by way of example only, impact sprinklers, rotator style sprinklers, and drip lines. A cable (not shown) runs the length of the irrigation pipeline 128 and provides power, and possibly control and communications, to the motorized towers 136, 138 and other electrical components positioned along the spans 130, 132. The pivot tower 134 includes a plurality of legs 142 and supports the fluid source 126 and prevents lateral movement thereof.

The portion of the irrigation pipeline 128 positioned within each span 130, 132 is slightly arched or bowed and is supported in such condition by a truss system 144 coupled with and positioned beneath the irrigation pipeline 128. Among other things, each truss system 144 includes a first truss rail 146 and a second truss rail (not shown). The first truss rail 146 and the second truss rail are substantially similar and the following description of the first truss rail 146 applies equally to the second truss rail, unless otherwise noted. With reference to the first span 130, a first end 150 of the first truss rail 146 is coupled with a first end 152 of the irrigation pipeline 128. Likewise, a second end 154 of the first truss rail 146 is coupled with the irrigation pipeline 128 at or near the first motorized tower 136. With reference to the second span 132, the first end 150 of the first truss rail 146 is coupled with the irrigation pipeline 128 at or near the first motorized tower 136 and the second end 154 of the first truss rail 146 is coupled with the irrigation pipeline 128 at or near the second motorized tower 138.

Each truss system 144 includes a plurality of pairs of struts 156, extending from the irrigation pipeline 128 with which they are coupled via conventional means (e.g., fastened to a mounting connection that is welded to the irrigation pipeline 128). Each pair of struts 156 additionally is coupled with each other at a coupling joint 158, as more fully described below. Each truss system 144 further includes a plurality of cross-members (not shown). Each cross-member extends from one of the coupling joints 158 of the first truss rail 146 to one of the coupling joints (not shown) of the second truss rail (not shown) and spaces the first and second truss rails from one another. In this way, the first and second truss rails are biased apart from one another by the cross-members.

Each truss rail 146 additionally includes a plurality of individual truss rods 110, 112 that are disposed generally in axial alignment (i.e., end to end) with one another. Each individual truss rod 110 is coupled with the next truss rod 112 in the series at a coupling joint 158.

Figure 3:
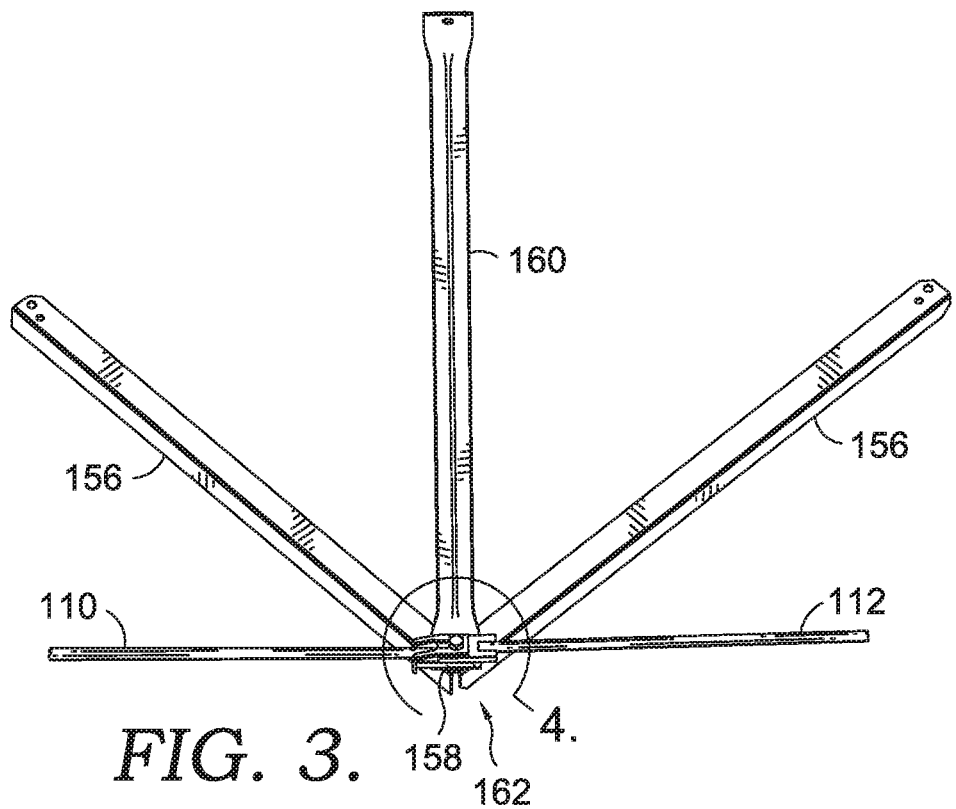
FIG. 3 is a fragmentary, perspective view of a coupling assembly in accordance an embodiment of the present disclosure.

With reference now to FIG. 3, illustrated is a perspective view of a non-welded, clevis-type coupling assembly 162 in accordance with embodiments of the present disclosure. The illustrated coupling assembly 162 may be utilized at the coupling joints 158 of the truss system 144 of FIG. 2, in accordance with embodiments of the present disclosure. In this way, the illustrated coupling assembly 162 is utilized to couple one end of each of the pair of struts 156, one end of a cross-member 160 and two individual truss rods 110, 112 with one another.

Figure 4:
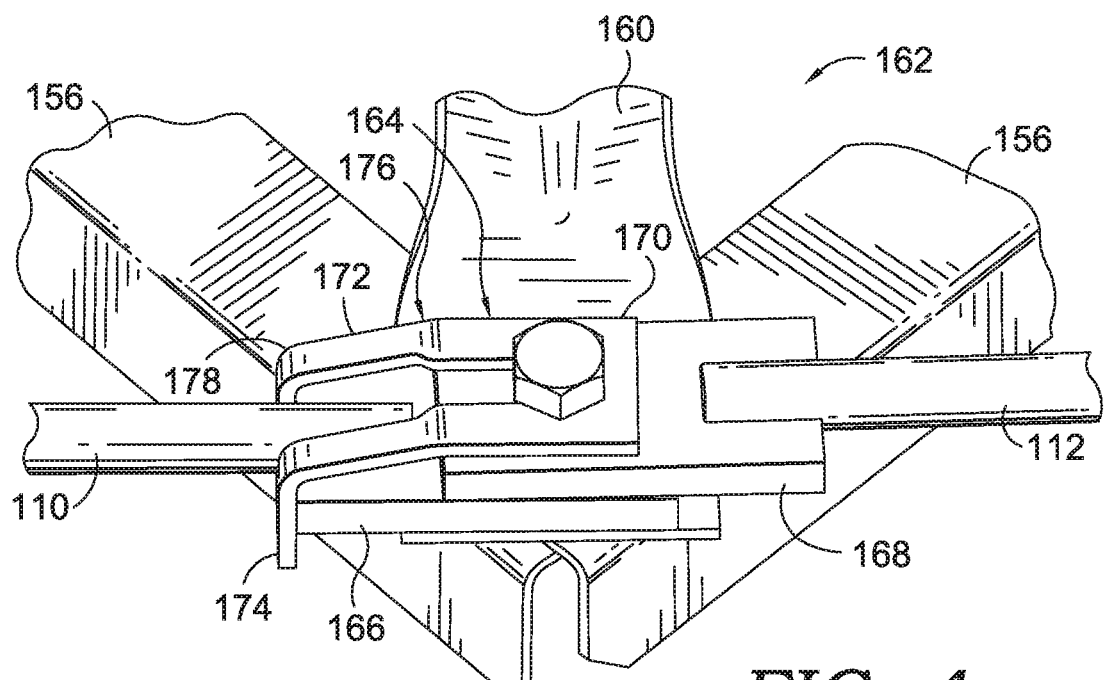
FIG. 4 is an enlarged, fragmentary, perspective view of the coupling assembly of FIG. 3, the view taken at line 4.
Figure 5:
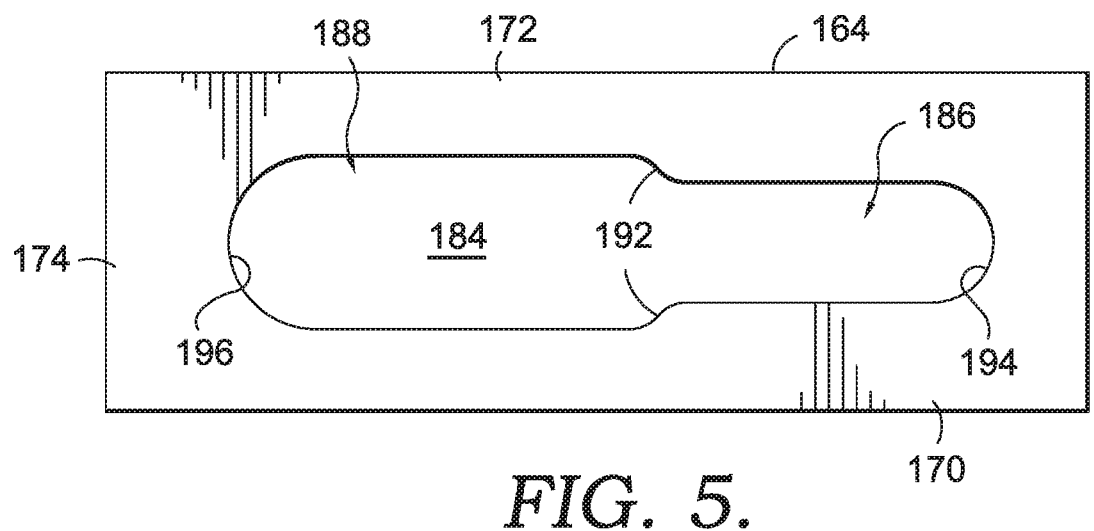
FIG. 5 is a top plan view of an exemplary, planar plate before being formed into a coupling plate, in accordance with embodiments of the present disclosure.
Figure 6:
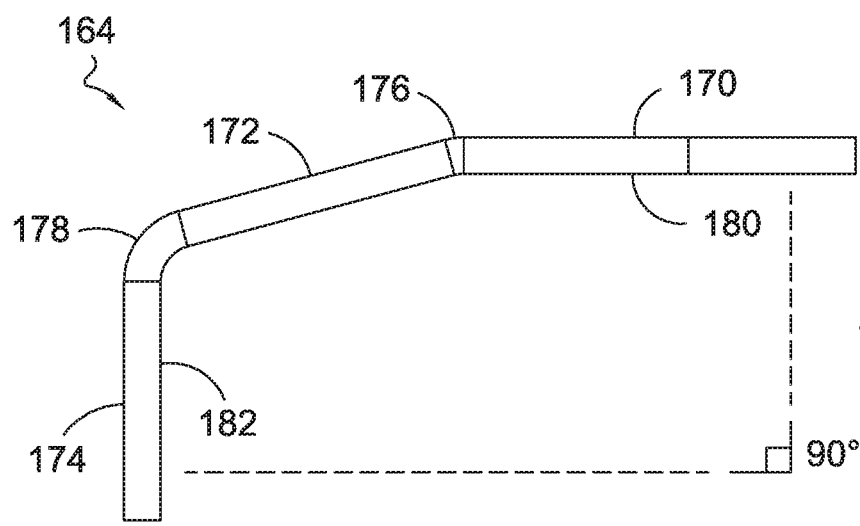
FIG. 6 is a side elevation view of the planar plate of FIG. 5 after it has been bent to form the coupling plate, in accordance with embodiments of the present disclosure.

FIG. 4 illustrates an enlarged perspective view of the coupling assembly 162 of FIG. 3. The coupling assembly 162 includes a coupling plate 164, the first truss rod 110 having a plated end 166, and the second truss rod 112 having a plated end 168. The coupling plate 164 includes a first section 170, a second section 172 and a third section 174. The second section 172 is positioned between and intermediate the first section 170 and the third section 174. In aspects, the first, second and third sections integrally form the coupling plate 164 as a single, continuous structure, as illustrated in FIG. 5. The coupling plate 164, as best illustrated in FIG. 6, includes a first curvature or bend 176 that transitions the coupling plate 164 between the first section 170 and the second section 172 thereof. The coupling plate 164 further includes a second curvature or bend 178 that transitions the coupling plate 164 between the second section 172 and the third section thereof 174. As best seen in the diagram of FIG. 6, the first section 170 and the third section 174 are oriented at a 90° angle with respect to one another. In aspects, the first section 170 includes a generally planar bottom surface 180 and the third section 174 includes a generally planar rear surface 182.

Figure 7:
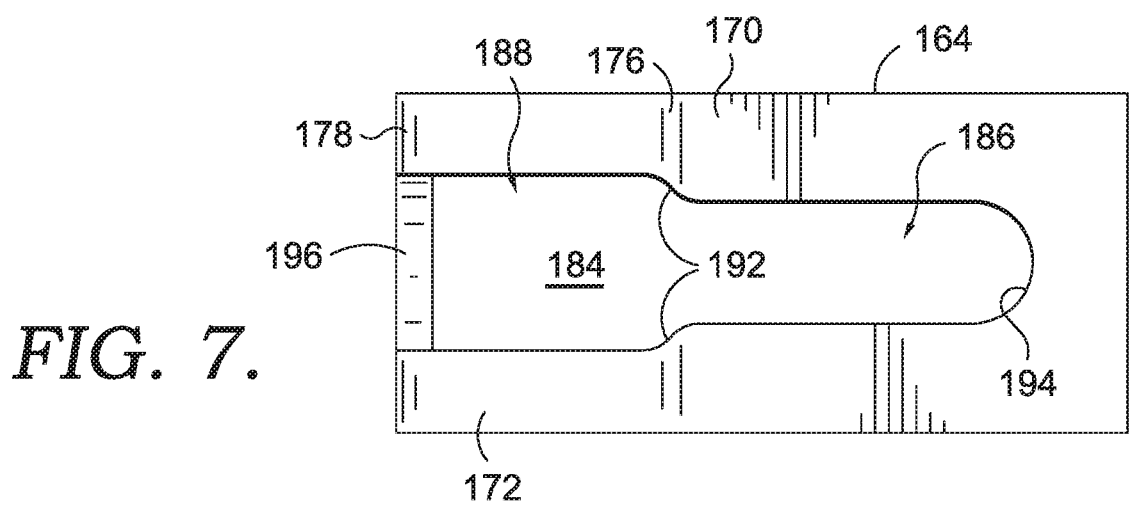
FIG. 7 is a top plan view of the coupling plate of FIG. 6.

As best seen in FIGS. 5 and 7, the coupling plate 164 includes a contiguous opening 184 extending there through comprised of two parts. A first part 186 of the opening has a first dimension (e.g., size and/or shape) and a second part 188 of the opening 184 has a second dimension (e.g., size and/or shape). The second dimension is larger than the first dimension. As more fully described below, the second dimension allows the coupling plate 164 to be placed over a plated end 166 of a truss rod 110 and the first dimension allows the coupling plate 164 to slip tightly against a fastening bolt 116, providing a clamping surface area for a fastening nut 190. In aspects, transitions 192 along the edges of the opening 184 between the first (smaller) dimension of the first part 186 and the second (larger) dimension of the second part 188 use radius shoulders and each end 194, 196 of the opening 184 contains rounded corners substantially equal to the width of the opening 184.

Figure 1:
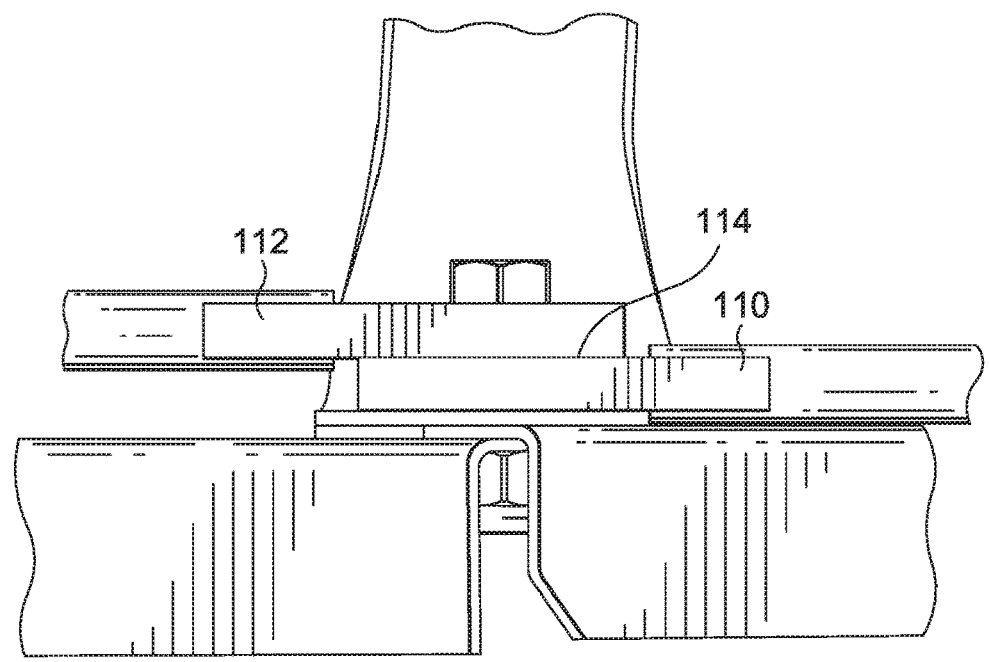
FIG. 1 is a fragmentary, bottom plan view of a prior art coupling assembly having a single sheer plane.
Figure 8:
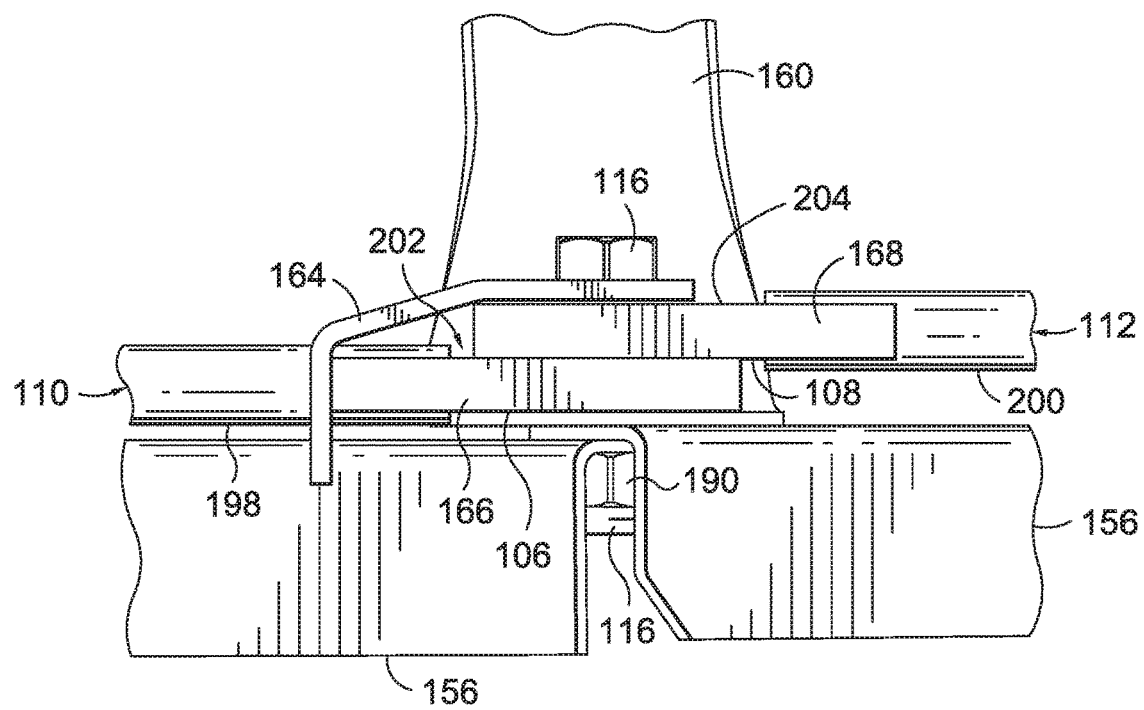
FIG. 8 is a bottom plan view of the coupling assembly of FIG. 4.

With reference now to FIG. 8, a bottom plan view of the non-welded, clevis-type coupling assembly 162 of FIG. 4 is illustrated to provide clarity to illustrated aspects hereof. Coupled with the struts 156 and the cross-member 160 utilizing the coupling plate 164 in accordance with aspects hereof are the first truss rod 110 and the second truss rod 112. Each of the first and second truss rods 110, 112 includes plated end 166, 168, respectively, at one end thereof. The generally rectangular plates 166, 168 are coupled with an elongated shaft 198, 200 of the first and second truss rods 110, 112, respectively, by any of a variety of means known to those having ordinary skill in the art to form plated truss rods. Each plate 166, 168 includes a generally planar top surface 202, 204, respectively, and a generally planar bottom surface 206, 208, respectively, at a portion of the plates 166, 168 that extends beyond the elongated shafts 198, 200.

Placement of a truss rod 110 relative to the contiguous opening 184 of the coupling plate 164 is best illustrated with reference to FIGS. 9-11. Initially, the substantially rectangular plate 166 of the truss rod 110 is inserted into the contiguous opening 184. The elongated shaft 198 of the truss rod 110 has a height in cross-section that exceeds the height in cross-section of the rectangular plate 166. Thus, the truss rod 110 is larger at the portion thereof that is coupled with the plate 166 than at the portion thereof where the plate 166 extends beyond the elongated shaft 198. Accordingly, that portion of the truss rod 110 that includes the elongated shaft 198 is inserted into the second part 188 of the contiguous opening 184. In aspects, the portion of the plate 166 that extends beyond the elongated shaft 198 is sized and shaped such that it can fit within the first part 186 of the contiguous opening 184. In aspects, even the portion of the plate 166 that extends beyond the elongated shaft 198 is too large to be inserted into the first part 186 of the contiguous opening 184. In such aspects (not shown), the entire plated portion of the truss rod 110 may be inserted into the second part 188 of the contiguous opening 184. Any and all such variations, and any combination thereof, are contemplated to be within the scope of embodiments of the present disclosure.

Once the plated end 166 of the truss rod 110 has fully passed through the opening 184, at least one of the truss rod 110 and the coupling plate 164 is rotated (for instance, 90°) such that the generally planar top surface 206 of the plated end 166 of the truss rod 110 is parallel with the generally planar bottom surface 180 of the first section 170 of the coupling plate 164. In this orientation, the elongated shaft 198 of the truss rod 110 extends through the second part 188 of the contiguous opening 184 and an end surface 210 of the plated end 166 of the truss rod 110 contacts at least a portion of the rear surface 174 of the third section 174 of the coupling plate 164, as illustrated in FIG. 11.

Figure 12:
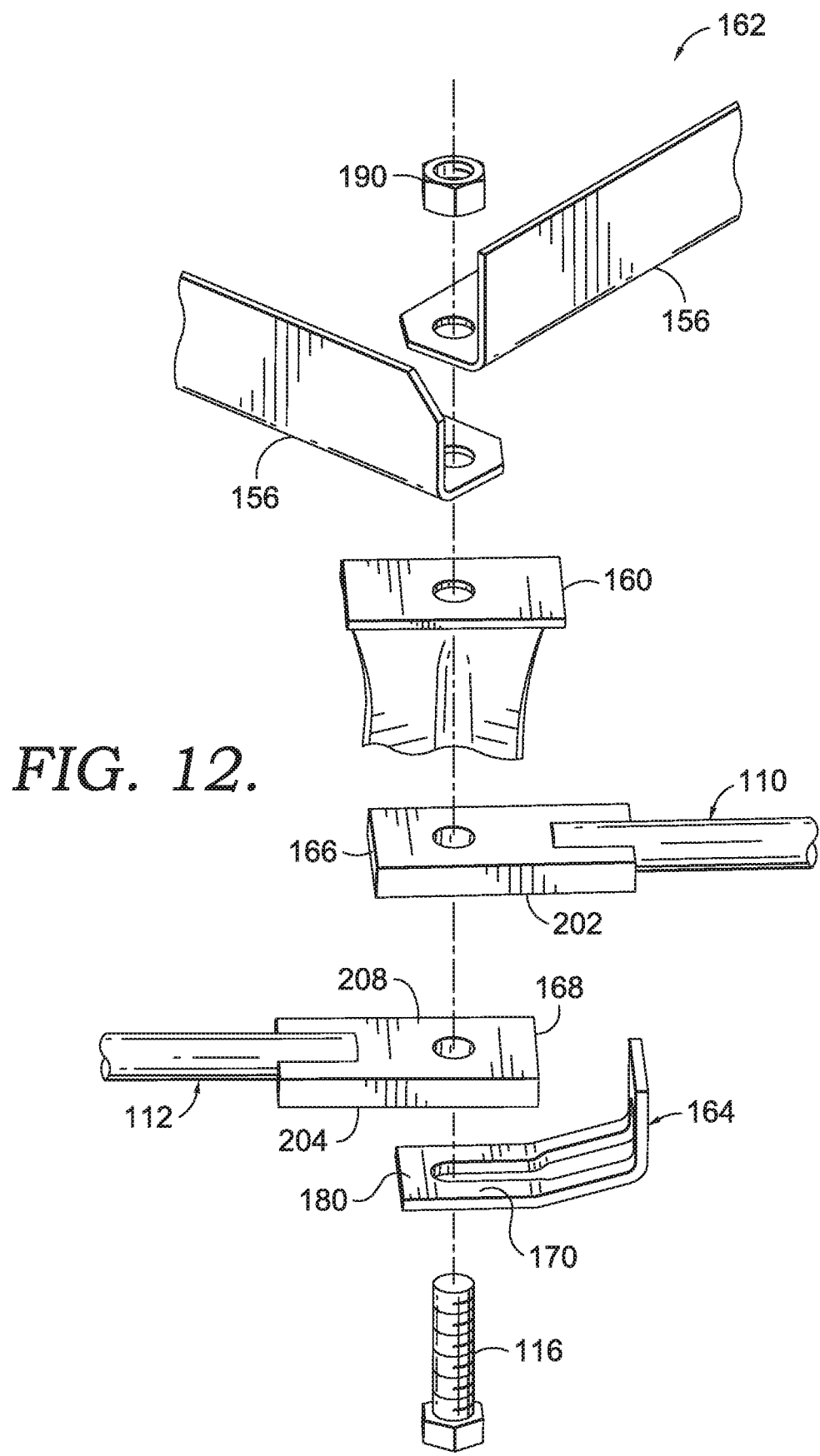
FIG. 12 is an exploded view of the coupling assembly of FIG. 4.

With reference now to FIG. 12, shown is an exploded perspective view illustrating the components and one possible order of assembly of the coupling assembly 162, in accordance with an embodiment of the present disclosure. The first plated truss rod 110 is coupled with the coupling plate 164, as shown in FIGS. 9-11. The second plated truss rod 112 is at least partially positioned between the bottom surface 180 of the first section 170 of the coupling plate 164 and the top surface 202 of the first plated truss rod 110. Each of the two struts 156 and the cross-member 160 are aligned on top of the coupling plate 164 and the truss rods 110, 112. The fastening bolt 116 is inserted into an opening in the coupling plate 164, the second plated truss rod 112, the first plated truss rod 110, the cross-member 160, and the first and second struts 156, the openings being sized and shaped to receive the bolt 116. The fastening nut 190 is mated with the fastening bolt 116 to maintain the coupling assembly 162 in a securely retained condition. Thus, the top surface 204 of the plated end 168 of the second truss rod 112 contacts and abuts the bottom surface 180 of the first section 170 of the coupling plate 164 forming a first sheer plane, and the bottom surface 208 of the plated end 168 of the second truss rod 112 contacts and abuts the top surface 202 of the plated end 166 of the first truss rod 110 forming a second sheer plane.

By adding the coupling plate 164 of the present disclosure to the coupling joint 158, the separation forces on each truss rod 110, 112 can be dispersed along the fastener 116. Accordingly, referencing FIG. 8 in particular, the lower truss rod 110 and the coupling plate 164 are both applying torque or forces on the fastener 116 in a direction to the left of the figure, and on opposite sides of the upper truss rod 112, and the upper truss rod 112 is applying a torque or force on the fastener 116 in a direction to the right of the figure. The coupling plate 164, consequently works to resists movement of the upper end of the fastener to the right of the figure and provides a second sheer plane between the coupling plate 164 and the top of the upper truss rod 112.

It will be recognized that the principles of the present disclosure are not limited to use with a center pivot irrigation system but also may be employed with other types of irrigation systems, including without limitation, lateral move systems and other types which do not employ a fixed center pivot tower. It further will be recognized that the principles of the present disclosure are not limited to irrigation systems but also may be employed with other types of coupled assemblies, for instance, grain elevator legs, truss support systems, and the like.

Additionally, although some exemplary implementations of the embodiments described herein are shown in the accompanying figures, these implementations are not intended to be limiting. Rather, it should be understood that the various embodiments and aspects described herein may be implemented upon other settings. It is within the scope of the present disclosure that the above principals could be equally applied in other settings.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

What is claimed is:

1. A truss rod coupling assembly, comprising:
   a coupling plate having a first section, a second section, and a third section coupled with one another such that the second section is positioned intermediate the first section and the third section, wherein the first section and the third section are oriented at a 90° angle with respect to one another, and wherein the coupling plate includes a contiguous opening extending there through, the contiguous opening including a first part having a first dimension and a second part having a second dimension, the second dimension being larger than the first dimension; and
   a first truss rod having a plated end, wherein the plated end of the first truss rod is positioned such that a top surface of the plated end of the first truss rod is parallel to and spaced apart from a bottom surface of the first section of the coupling plate and a non-plated portion of the first truss rod extends through the contiguous opening.

2. The truss rod coupling assembly of claim 1, further comprising a second truss rod having a plated end, wherein the plated end of the second truss rod is positioned at least partially between the first section of the coupling plate and the plated end of the first truss rod.

3. The truss rod coupling assembly of claim 2, wherein the plated end of the second truss rod includes a top surface and a bottom surface, wherein the top surface of the plated end of the second truss rod abuts the bottom surface of the first section of the coupling plate, forming a first sheer plane, and wherein the bottom surface of the plated end of the second truss rod abuts the top surface of the plated end of the first truss rod, forming a second sheer plane.

4. The truss rod coupling assembly of claim 3, further comprising:
   a bolt extending through the first part of the contiguous opening in the coupling plate, the plated end of the first truss rod, and the plated end of the second truss rod; and
   a nut mated with the bolt and securing the truss rod coupling assembly.

5. The truss rod coupling assembly of claim 4, wherein an end surface of the plated end of the first truss rod is parallel to a rear surface of the third section of the coupling plate, and wherein the end surface of the plated end of the first truss rod and the rear surface of the third section of the coupling plate are in at least partial contact.

6. The truss rod coupling assembly of claim 1, comprising at least one mechanical brace structure positioned beneath a bottom surface of the plated end of the first truss rod, wherein the bolt extends through the mechanical brace structure.

7. The truss rod coupling assembly of claim 1, wherein the first section, the second section, and the third section integrally form the coupling plate.

8. The truss rod coupling assembly of claim 1, wherein the coupling plate includes a first curvature that transitions the coupling plate between the first section and the second section and a second curvature that transitions the coupling plate between the second section and the third section, wherein the first curvature has an angle that prevents the plated end of the second truss rod from sliding toward the coupling plate, and wherein the second curvature has an angle that prevents the plated end of the first truss rod from sliding toward the coupling plate.

9. A truss rod coupling device, comprising:
   a coupling plate having a first section, a second section, and a third section coupled with one another such that the second section is positioned intermediate the first section and the third section, the first section and the third section being oriented at a 90° angle with respect to one another, wherein the coupling plate includes a contiguous opening extending there through, the contiguous opening including a first part having a first dimension and a second part having a second dimension, the second dimension being larger than the first dimension.

10. The truss rod coupling device of claim 9, wherein the first part of the contiguous opening extends through at least a portion of the first section of the coupling plate.

11. The truss rod coupling device of claim 10, wherein the second part of the contiguous opening extends through at least a portion of the second section of the coupling plate and at least a portion of the third section of the coupling plate.

12. The truss rod coupling device of claim 9, wherein first section, the second section, and the third section integrally form the coupling plate.

13. The truss rod coupling device of claim 9, wherein the coupling plate includes a first curvature that transitions the coupling plate between the first section and the second section and a second curvature that transitions the coupling plate between the second section and the third section, wherein when in use, the first curvature has an angle that prevents a plated end of a first truss rod from sliding toward the coupling plate and wherein the second curvature has an angle that prevents the plated end of a second truss rod from sliding toward the coupling plate.

14. A method of forming a truss rod coupling assembly, comprising:

inserting a plated end of a first truss rod into a contiguous opening of a coupling plate;

orienting the coupling plate such that a bottom surface of an upper portion of the coupling plate and a top surface of the plated end of the first truss rod are parallel to one another;

inserting at least a portion of a plated end of a second truss rod between the bottom surface of the upper portion of the coupling plate and the top surface of the plated end of the first truss rod;

orienting the first truss rod such that a base portion of the plated end of the first truss rod contacts at least a portion of a rear surface of a lower section of the coupling plate;

extending a bolt through the contiguous opening, the plated end of the second truss rod, and the plated end of the first truss rod; and securing the bolt such that the bottom surface of the upper portion of the coupling plate contacts the top surface of the plated end of the second truss rod forming a first sheer plane and the bottom surface of the plated end of the second truss rod contacts the top surface of the plated end of the first truss rod forming a second sheer plane.

15. The method of claim 14, wherein the coupling plate includes a first section, a second section, and a third section coupled with one another such that the second section is positioned between the first section and the third section, and wherein the first section and the third section are oriented at a 90° angle with respect to one another.

16. The method of claim 15, wherein the upper portion of the coupling plate corresponds with the first section, and wherein the lower portion of the coupling plate corresponds with the third section.

17. The method of claim 14, wherein the contiguous opening in the coupling plate includes a first part having a first dimension and a second part having a second dimension, the second dimension being larger than the first dimension.

18. The method of claim 14, wherein orienting the coupling plate such that a bottom surface of a portion of the coupling plate and a top surface of the plated end of the first truss rod are parallel to one another comprises rotating the coupling plate 90°.

19. The method of claim 14, further comprising positioning at least one mechanical brace structure beneath a bottom surface of the plated end of the first truss rod and extending the bolt extends through the mechanical brace structure prior to securing the bolt.

20. The method of claim 14, wherein the coupling plate includes a first curvature and a second curvature, the first curvature being of an angle that prevents the plated end of a first truss rod from sliding toward the coupling plate and the second curvature being of an angle that prevents the plated end of a second truss rod from sliding toward the coupling plate.

* * * * *